US006119512A

United States Patent [19]

Duty et al.

[11] Patent Number: 6,119,512

[45] Date of Patent: Sep. 19, 2000

[54] METHOD OF DETERMINING A FUEL TANK VAPOR FLOW RATE

[75] Inventors: Mark J. Duty, Davison; Timothy A. Coatesworth, Lake Orion, both of Mich.

[73] Assignee: DaimlerChrysler Corporation, Auburn Hills, Mich.

[21] Appl. No.: 09/232,281

[22] Filed: Jan. 15, 1999

[51] Int. Cl.[7] .................................................... G01M 15/00

[52] U.S. Cl. ........................................... 73/118.1; 123/698

[58] Field of Search ................................ 73/117.3, 118.1; 123/698, 674, 516, 518, 519, 520

[56] References Cited

U.S. PATENT DOCUMENTS

| | | | |
|---|---|---|---|
| 4,821,701 | 4/1989 | Nankee et al. | 123/520 |
| 5,299,544 | 4/1994 | Kitamoto et al. | 123/520 |
| 5,373,822 | 12/1994 | Thompson | 123/520 |
| 5,465,703 | 11/1995 | Abe | 123/698 |
| 5,495,749 | 3/1996 | Dawson et al. . | |
| 5,606,121 | 2/1997 | Blomquist et al. . | |
| 5,616,836 | 4/1997 | Blomquist et al. . | |
| 5,626,122 | 5/1997 | Azuma | 123/698 |
| 5,635,630 | 6/1997 | Dawson et al. . | |
| 5,641,899 | 6/1997 | Blomquist et al. . | |
| 5,651,350 | 7/1997 | Blomquist et al. . | |
| 5,685,279 | 11/1997 | Blomquist et al. . | |
| 5,715,799 | 2/1998 | Blomquist et al. . | |
| 5,988,151 | 11/1999 | Schneider | 123/698 |
| 6,016,460 | 1/2000 | Olin et al. | 701/102 |
| 6,047,688 | 4/2000 | Duty et al. | 123/698 |

OTHER PUBLICATIONS

Pending patent application serial No. 09079706, filed May 5, 1998, entitled "Proportional Purge Solenoid Control System", in the name of Blomquist et al. (Do Not Publish).

*Primary Examiner*—Erick Solis
*Attorney, Agent, or Firm*—Mark P. Calcaterra

[57] ABSTRACT

A method is provided for accommodating the purge vapors from an evaporative emission control system of an automotive vehicle. The method includes a means of learning the flow rate of purge vapors from the fuel tank. The fuel tank model uses the output of a strategic adaption routine to learn the tank vapor flow rate. This flow rate is used to maintain fuel to air control under varying air flow and purge flow conditions especially under return-to-idle situations. As such, the fuel to air ratio at the injectors can be controlled under varying air flow and purge flow conditions to improve drivability and emissions.

8 Claims, 6 Drawing Sheets

METHOD OF DETERMINING A FUEL TANK VAPOR FLOW RATE

BACKGROUND OF THE INVENTION

1. Technical Field

The present invention relates generally to evaporative emission control systems for automotive vehicles and, more particularly, to a method of compensating for purge vapors from an evaporative emission control system for an automotive vehicle.

2. Discussion

Modern automotive vehicles typically include a fuel tank and an evaporative emission control system that collects volatile fuel vapors generated in the fuel tank. The evaporative emission control system includes a vapor collection canister, usually containing an activated charcoal mixture, to collect and store volatile fuel vapors. Normally, the canister collects volatile fuel vapors which accumulate during refueling of the automotive vehicle or from evaporation of the fuel. The evaporative emission control system also includes a purge valve placed between an intake manifold of an engine of the automotive vehicle and the canister. At certain times conducive to purging, the purge valve is opened by an engine control unit an amount determined by the engine control unit to purge the canister, i.e., the collected volatile fuel vapors are drawn into the intake manifold from the canister for ultimate combustion within a combustion chamber of the engine.

As one skilled in the art will appreciate, the entry of purge vapors into the combustion chambers of the engine change the combustion characteristics of the engine. More particularly, the presence of purge vapors in the intake manifold change the required amount of fuel injected from the fuel injectors to maintain optimum drivability. Injecting too much fuel in the presence of the purge vapors causes an improper fuel to air ratio which may result in incomplete combustion, rough engine operation and poor emissions.

Although prior art methods of accounting for purged volatile fuel vapors from the evaporative emission control system have achieved favorable results, there is room for improvement in the art. For instance, it would be desirable to provide a method of identifying the source of the vapors from within the evaporative emission control system based on source characteristics, anticipating variations in the level of purge vapors using learned information from the identified source, and adjusting the amount of fuel delivered from the fuel injectors in accordance with the variations and sources of the purge vapors to maintain a desired fuel to air ratio.

SUMMARY OF THE INVENTION

It is, therefore, one object of the present invention to provide a method of accounting for purge vapors in an evaporative emission control system of an automotive vehicle.

It is another object of the present invention to provide a method of learning the concentration of purge vapor, identifying the source of the purge vapor, and predicting variations in purge vapor concentrations as a function of purge flow.

It is yet another object of the present invention to provide a method of identifying the appropriate time to initiate a purge cycle, providing the appropriate flow conditions such that the concentration of purge vapor can be learned, and controlling the purge flow rate such that purge vapors are depleted from the system.

It is still yet another object of the present invention to provide a method for predicting the concentration of purge vapor at the purge valve of the evaporative emission control system as a function of purge flow and accumulated flow through the canister.

It is another object of the present invention to provide a method of learning changes in the mass of the canister such that a mass of purge vapor in the canister can be determined.

It is yet another object of the present invention to provide a method of learning the flow rate of purge vapors from the fuel tank such that the fuel delivered through the injectors can be controlled under varying air flow and purge flow conditions.

It is still yet another object of the present invention to provide a method of accounting for a predictable purge vapor surge from the canister to provide improved fuel to air control and emissions results.

It is another object of the present invention to provide a method of learning the distribution of purge vapors within the engine manifold such that the amount of fuel delivered from various injectors can be selectively controlled to accommodate the purge vapor at that location of the engine.

To achieve the foregoing objects, the present invention provides a method of accounting for purge vapors in an evaporative emission control system of an automotive vehicle. The method includes a purge compensation model for identifying the concentration of purge vapor entering the intake manifold of the engine, identifying the source of the vapor as from the vapor collection canister or the fuel tank, and using this information to predict variations in vapor concentrations as a function of purge flow. Preferably, predicting variations in vapor concentrations is accomplished by using a physical model of the mass of air flow through the purge valve (based on air density). The mass of air flow is then modified based on the density of hydrocarbon for the learned concentration of purge vapors in the system. The method also includes a purge control model which uses mode logic to identify an appropriate time to initiate a purge cycle, provides the flow conditions necessary for a learning portion of the purge compensation model and increases purge flow rates after the learning is complete to deplete the contents of the canister. The purge control model also manages the time spent with purge active (learning purge) and purge inactive (learning volumetric efficiency or EGR). Preferably, the mode logic initiates a sequence of purge-active/purge-inactive cycles based on the learned parameters of the system through oxygen-sensor feedback. The following sequence is performed to learn the required parameters: a) learn the volumetric efficiency of the engine; b) learn the concentration and stability of the purge vapor during a low flow condition to identify a level of canister loading; c) increase purge flow through the purge valve using the learned canister information and learn deviations from a canister surface (i.e., model) as a function of tank flow; and d) repeat (a) and (c) indefinitely for the remainder of the drive.

As described in greater detail below, the present invention characterizes purge valve flow by using a surface for determining air mass flow rate as a function of vacuum at the purge valve and purge valve current. The flow through the valve is used to compute instantaneous flow rate and accumulated flow rate. A tactical adaption routine provides short term purge compensation (i.e., a tactical error term) through use of oxygen sensor feedback using proportional-integral control on an oxygen sensor integral error to tactically account for the purge concentration at the intake manifold.

This term eventually forms the basis for all learning within the purge system.

The tactical adaption routine allows the system to maintain control and stability in the oxygen sensor feedback part of the methodology by extracting the integral error and learning it as representing purge concentration. By regulating the learning rate of the tactical adaption routine ($O_2$ rate/10) and a strategic adaption routine described below ($O_2$ rate/100), the learning of a quasi-steady state purge vapor concentration is made possible. Also, due to the controlled learning rate, the ability to disseminate the level of short term purge compensation (i.e., the tactical error term) into the appropriate source (canister loading or tank flow rate) is made possible without losing control stability.

The strategic adaption routine is performed to direct the tactical error term to a canister model for learning canister loading or to a fuel tank model for learning tank vapor flow rates. The strategic adaption routine also combines the tactical error term and the contribution from the canister and fuel tank models to yield a total purge concentration at the manifold.

The canister model uses the output of the strategic adaption routine to learn the loading of the canister. Thereafter, the canister model uses the learned tank flow rate from the tank model to compute the mass balance of purge vapor exiting and entering the canister. Based on the current loading of the canister, an open loop surface of canister concentration as a function of flow rate and accumulated flow is used to predict how the concentration will change as the flow rate through the canister changes.

The fuel tank model uses the output of the strategic adaption routine to learn the tank vapor flow rate. This flow rate is used to maintain fuel to air control under varying air flow and purge flow conditions especially under return-to-idle situations. Fuel tank flow rate is important because it can contribute to large variations in purge concentrations at the purge valve, and thus the entry to the manifold. This occurs when the tank vapor flow rate approaches the flow rate of the purge valve during low airflow conditions such as during idle, low load situations. Since the concentration of vapor from the tank is about 100%, as the purge valve flow approaches the tank flow, large variations in purge concentration at the manifold can be observed. Prior art methods of control which use a single adaptive cell to learn purge concentration typically exhibit rich fuel/air excursions on return to idle conditions resulting in HC emissions, and lean excursions on accelerations from idle resulting in NOX emissions. Learning the tank flow rate properly reduces these occurrences and, when coupled with closed loop feedback, these occurrences can be virtually eliminated.

A purge transport delay in the form of a first-in-first-out shift register is used to account for the delay that occurs in flow as the purge valve position is changed. Each position in the register is identified by a time and loaded from one side with the instantaneous flows as they occur at the valve. A table consisting of transport delays controls the delay time used per flow rate. Generally, low flows are given long delays and high flows are given shorter delays as measured on the system. The transport delay provides part of the timing required to determine when to compensate for a flow of purge vapors into the manifold by reducing the amount of fuel injected into the port. The remaining delay time is accounted for by the filling of the Intake Manifold. By timing the compensation correctly, the desired fuel/air ratio can be maintained for improved emissions and drive quality.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is a more detailed view of the purge compensation model portion of the method of FIG. 2;

FIG. 7 is a more detailed view of the canister model portion of the purge compensation model of FIG. 3;

FIG. 8 is a more detailed view of the fuel tank model portion of the purge compensation model of FIG. 3;

DETAILED DESCRIPTION OF THE PREFERRED EMBODIMENTS

Figure 1:
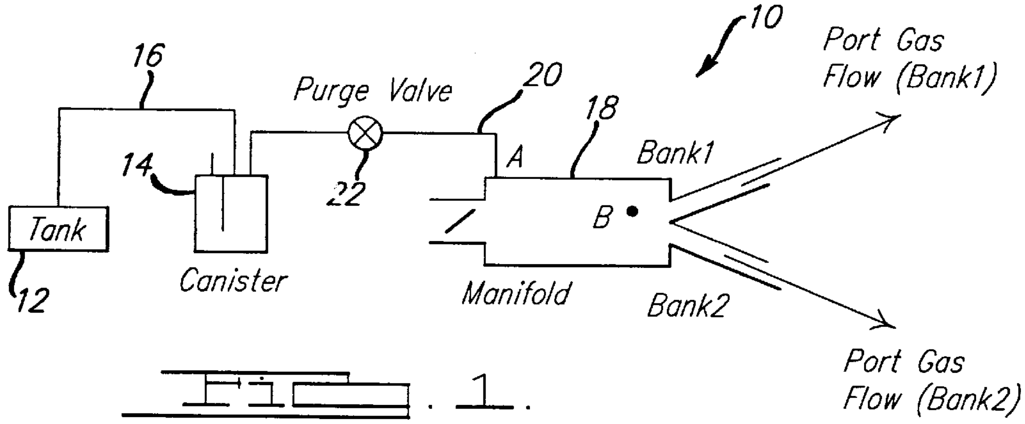
FIG. 1 is a schematic diagram of an evaporative emission control system according to the present invention.

Referring now to the drawing figures, FIG. 1 illustrates an evaporative emission control system 10 for an automotive vehicle. The evaporative emission control system 10 generally includes a fuel tank 12 connected to a vapor collection canister 14 by a vapor conduit 16. As can be appreciated, this is merely a representative example of several possible means by which the fuel tank 12 may be connected to the canister 14. An intake manifold 18 is connected to the canister 14 by a conduit 20. A purge valve 22 is mounted along the conduit 20. The control system 10 also includes an engine control unit (not shown) connected to and operative for controlling the purge valve 22.

In operation, a supply of volatile liquid fuel for powering an engine of the automotive vehicle is placed in the fuel tank 12. As fuel is pumped into the fuel tank 12, or as the fuel evaporates, vapors from the fuel pass through the conduit 16 and are collected and stored in the canister 14. Although the purge valve 22 is normally closed, under certain vehicle operating conditions conducive to purging, the engine control unit operates the purge valve 22 such that a certain amount of engine intake vacuum is applied to the canister 14. The intake vacuum draws the collected vapors from the canister 14 through the conduit 20 and the purge valve 22. From the purge valve 22, the vapors flow into the intake manifold 18 for combustion in the combustion chambers. As such, the vapors are purged from the system.

Figure 2:
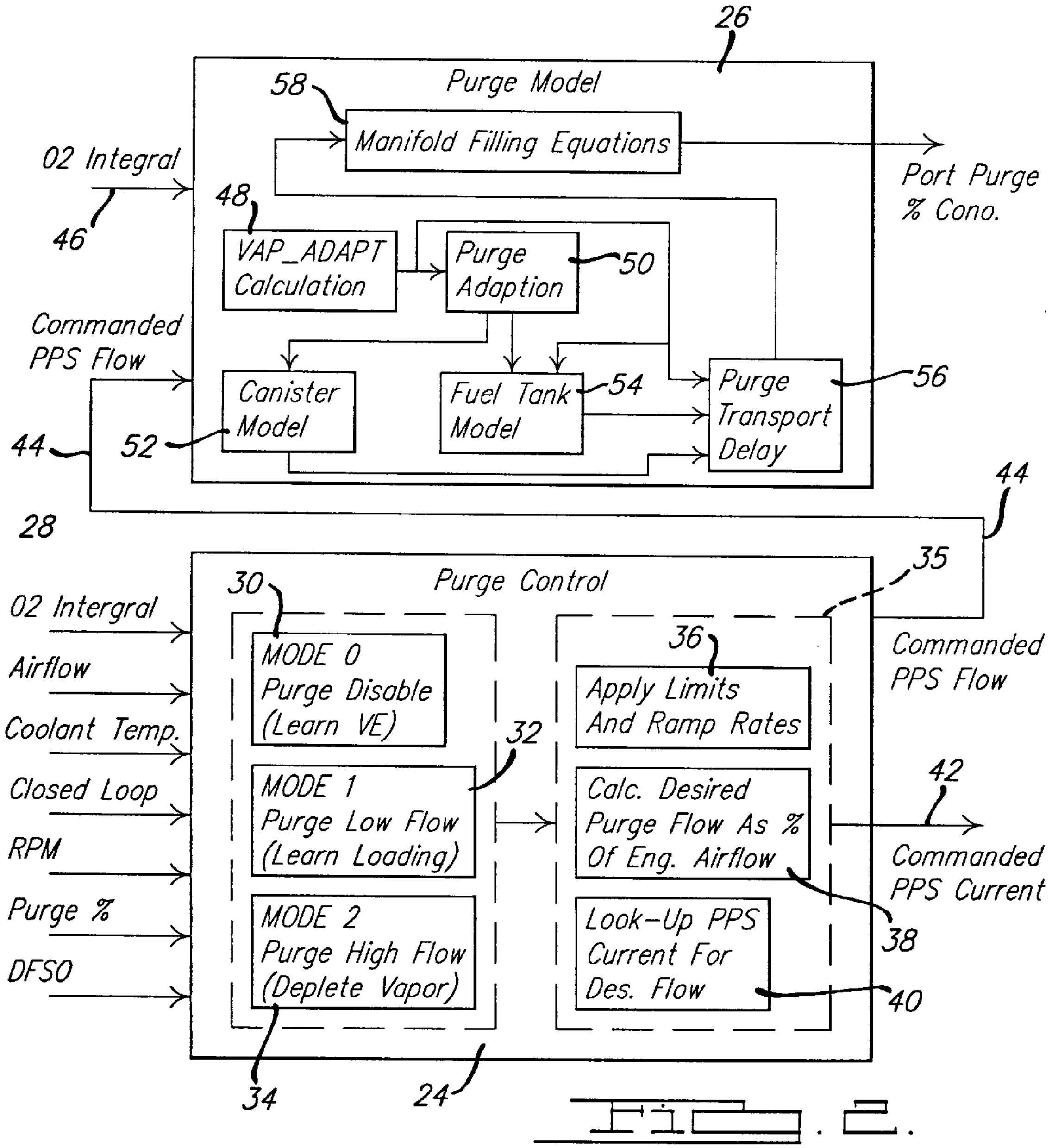
FIG. 2 is a diagrammatic representation of a method of purging the evaporative emission control system of FIG. 1 according to the present invention.
Figure 2:
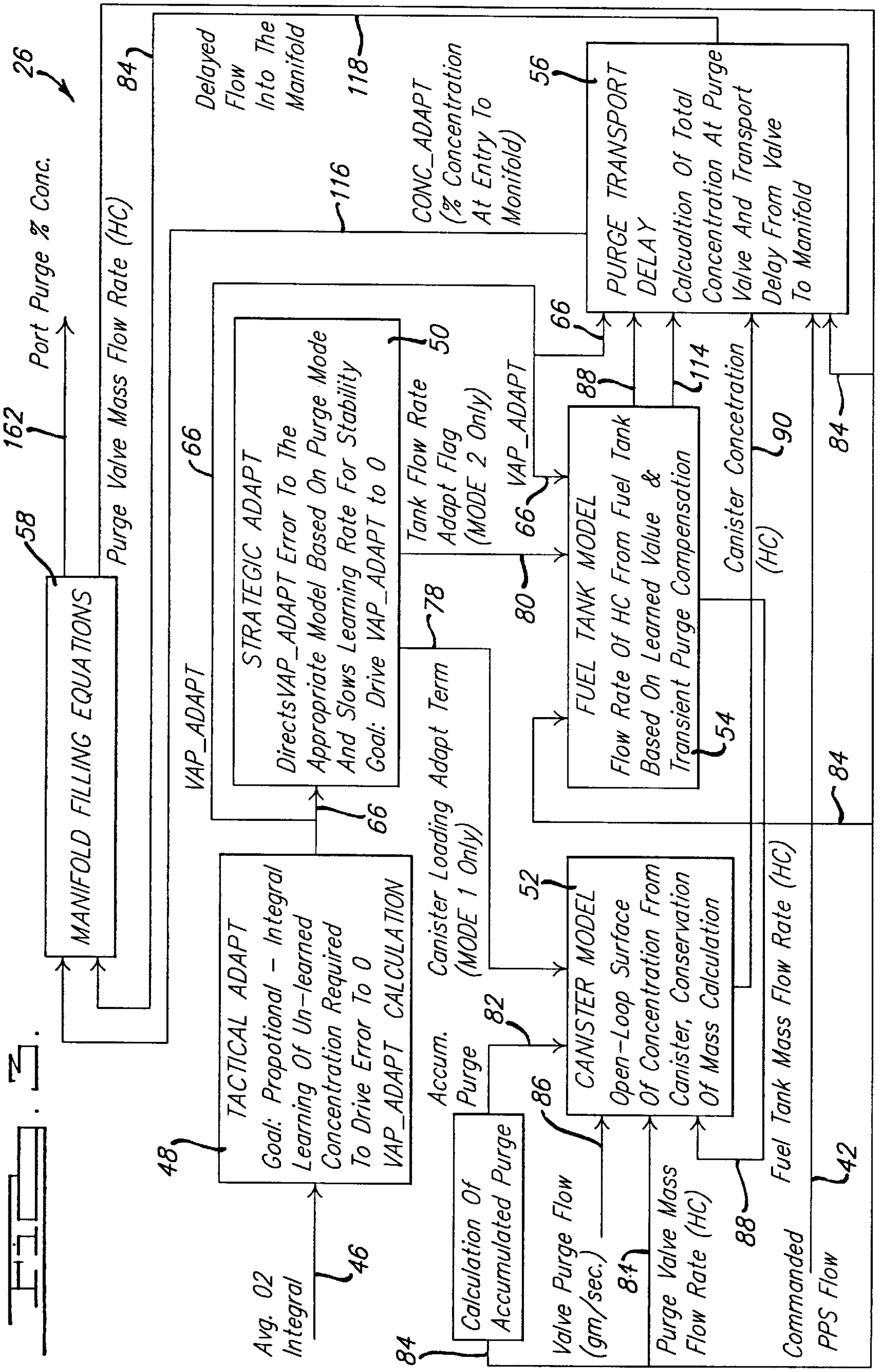

Turning now to FIG. 2, a diagrammatic representation of a method for depleting the purge vapors from the evaporative emission control system 10 of FIG. 1 is illustrated. The method generally includes two primary routines referred to as the purge control model 24 and the purge compensation model 26. The purge control model 24 begins by receiving a number of input parameters generally indicated at 28. The purge control model 24 uses the input parameters 28 to set a flag such that a preselected mode of operation is commanded based on the given environmental, operational, and feedback indicators available to the system. The input parameters 28 which are presently preferred include:

a) An oxygen sensor integral value which provides feedback information regarding the level of fuel control error (i.e., tactical error) present in the system. If purge is disabled this is viewed as a volumetric efficiency error or an EGR error. If purge is enabled this is viewed as purge concentration error.

b) An airflow value of the level of air flowing into the manifold as measured by a mass airflow sensor or calculated using a manifold pressure sensor. This provides a target flow that the purge valve attempts to match a fraction of when enabled. Tracking a continuous fraction of airflow yields a quasi stead-state ratio of HC from purge to air which simplifies the fuel compensation task.

c) A coolant temperature value which is used to identify the thermal conditions required for volumetric efficiency learning to occur and initiates a timer for a volumetric efficiency learn window at the end of which purge will initiate.

d) A closed loop flag is used since oxygen sensor feedback is relied upon for initially learning the purge concentration. This flag, which indicates that closed loop feedback is available, is required for enabling a purge event.

e) An RPM value (Engine Speed in Revolutions Per Minute) is used to indicate a start or stall condition under which the mode logic described below is reset.

f) A purge percent value, which is the calculated purge percent from the last pass through the purge model, and is used to determine the desired fraction of engine airflow to match at the purge valve and when to disable purge if the purge percentage falls below a calibrated threshold. This threshold indicates a clean canister.

g) A DFSO flag (Deceleration Fuel Shut Off) is used to indicate when purging is to be temporarily disabled. Since the flow of injected fuel is stopped during DFSO, the purge flow must be stopped or incomplete combustion will occur resulting in poor emissions.

Depending upon the values of the input parameters 28, the methodology uses mode logic 29 to command the automotive vehicle engine to operate in one of three modes 30, 32, or 34. In mode 0, generally indicated at 30, the purge feature of the present invention is disabled and the methodology learns the volumetric efficiency or EGR of the automotive vehicle engine. If the automotive vehicle is operating in mode 1, generally indicated at 32, the purge flow is relatively low. As such, the methodology learns the level of canister loading. If the automotive vehicle is in mode 2, generally indicated at 34, a high flow of purge vapor is available. As such, the methodology depletes the stored vapor from the evaporative emissions control system.

The following OR conditions determine that the vehicle should be commanded to operate in mode 0:

a) RPM is below a calibrated lower limit value (or fuel delivery mode is not in run mode);

b) Fuel control is in open loop;

c) DFSO is active;

d) Purge percentage is less than a calibrated lower limit value for a calibrated time;

e) Modeled canister mass is less than a calibrated lower limit value for a calibrated time; OR f) Oxygen sensor integral value is exceeding a calibrated upper limit value for a calibrated time (indicating lack of control).

The following AND conditions determine that the vehicle should be in mode 1 (purge enabled in low flow mode—learning canister loading):

a) Fuel control is in closed loop;

b) DFSO is not active;

c) RPM is above a calibrated lower limit threshold (or fuel delivery mode is in run mode);

d) Oxygen sensor integral value is below a calibrated threshold for entering mode 1 (meaning volumetric efficiency is learned in the current cell);

e) A calibrated time has elapsed while conditions were present for learning volumetric efficiency (as defined by the coolant temperature and closed loop inputs); AND f) Mode 1 has not been completed during this drive cycle.

The following AND conditions determine that the vehicle should be operating in mode 2 (purge enabled in high flow mode—learning tank flow):

a) Fuel control is in closed loop;

b) DFSO is not active;

c) RPM is above a calibrated lower limit threshold (or fuel delivery mode is in run mode);

d) A minimum volume has been purged from the canister as calculated in an accumulated mass variable routine in the purge model below. This is to ensure that a sufficient portion of the canister surface (i.e., model) which is suitable for learning the canister loading is has been sampled;

e) Purge percentage is not below a calibrated lower limit threshold for a calibrated amount of time; AND f) Modeled canister mass is not less than a calibrated lower limit value for a calibrated time.

After commanding the proper mode of operation at block 24, the methodology continues to a flow control system 35. The system 35 includes a control block 36 wherein limits and ramp rates are applied. Limits are applied to the commanded flow through the purge valve in modes 1 and 2 based on the desired type of control. In mode 1, the rate of purge flow is limited to a calibrated low flow level to ensure that enough flow is available for learning the level of purge concentration but is also limited to avoid large fuel/air deviations due to the presence of purge vapors in the intake manifold that have not yet been learned. In mode 2, the rate of purge flow is limited to a calibrated maximum flow level for high flow mode (depending on the tolerance of the engine to purge, i.e., cylinder to cylinder distribution characteristics etc.). This may be done to prevent drive issues, or more commonly to limit the commanded purge flow to that level at which the purge valve can flow under the give pressure delta across the part. From block 36, the methodology advances to block 38 and calculates a desired purge flow rate through the purge valve as a percentage or fraction of the rate of air flow through the engine. From block 38 the methodology advances to block 40 and looks-up the appropriate proportional purge solenoid current for the desired flow through the purge valve.

The result of blocks 36, 38, and 40 are sent to the purge valve 22 of FIG. 1 as a commanded proportional purge solenoid current, generally indicated at 42, to allow a given rate of purge flow to pass therethrough. In addition to the commanded proportional purge solenoid current 42, a commanded proportional purge solenoid flow value (i.e., the amount of purge flow) results from blocks 36, 38, and 40. The commanded proportional purge solenoid flow value, generally indicated at 44, is sent to the purge compensation model 26 for further processing.

In the purge compensation model 26, the commanded purge flow value 44 is used as feedback such that the correct purge flow, purge concentration and corresponding HC mass can be calculated. These values are then used to anticipate the amount of fuel compensation required at the fuel injectors to accommodate the change in purge flow into the manifold. Further, the commanded proportional purge solenoid flow value 44 is combined with an oxygen sensor integral error 46 (i.e., the tactical error or short term purge concentration value) at a vapor adaptive calculation routine 48 of the purge compensation model 26. The oxygen sensor integral error is used to fine tune the value of the actual concentration of purge vapors and ultimately to adjust fuel compensation for any errors that are not comprehended by the purge compensation model 26.

As described, the vapor adaptive calculation routine 48 provides a short term purge compensation value (i.e., tactical error) to account for the purge concentration at the manifold. The short term purge compensation value is provided through use of oxygen sensor feedback in the form of the oxygen sensor integral error. The purge compensation value is used to vary the amount of fuel delivered through the injectors to maintain a desired fuel to air ratio in the presence of the purge vapors. Further, the short term purge compensation value forms the basis for all learning within the purge compensation model 26.

From the vapor adaptive calculation routine 48, the methodology advances to a strategic or purge adaption routine 50. The purge adaption routine 50 directs the vapor adaption calculation result (i.e., the short-term purge compensation value) to a canister model 52 for learning the level of canister loading or to a fuel tank model 54 to learn tank vapor flow rate. The short term purge compensation value, the level of canister loading, and fuel tank flow rate are used to yield a total purge concentration. This total purge concentration is then used in a purge transport delay routine 56.

The purge transport delay routine 56 accounts for the delay that occurs in flow as the purge valve position (and thus the purge flow rate) is changed. As such, changes in the amount of fuel injected are not made until the new purge flow concentration reaches the intake manifold of the engine. From the purge transport delay routine 56, the methodology advances to a manifold filling routine 58. In the manifold filling routine 58, the injectors along each bank of the automotive vehicle engine are selectively adjusted to accommodate the amount of purge vapor present in that bank.

Referring now to FIG. 3, a more detailed view of the purge compensation model 26 is illustrated. Although not illustrated, one skilled in the art will appreciate that the purge compensation model 26, as well as the remainder of the present invention, is performed in a controller of the automotive vehicle within which it is implemented, such as the engine control unit. Initially, the average of both banks' oxygen sensor integral error 46, which is representative of the purge vapor concentration, is fed into a tactical adaptive routine 48, formerly referred to in FIG. 2 as the vapor adaptive calculation routine 48. In the tactical adaptive routine 48, the methodology learns the unlearned concentration of vapor required to drive the integral error 46 to zero. That is, an integral error 46 which is not zero indicates that the fuel to air ratio within the injectors is not optimum due to the presence of purge vapors. By learning the concentration of vapors, the fuel delivered by the injectors may be adjusted (i.e., reduced) such that the desired fuel to air ratio is achieved. This will be indicated when the integral error 46 equals zero.

Figure 4:
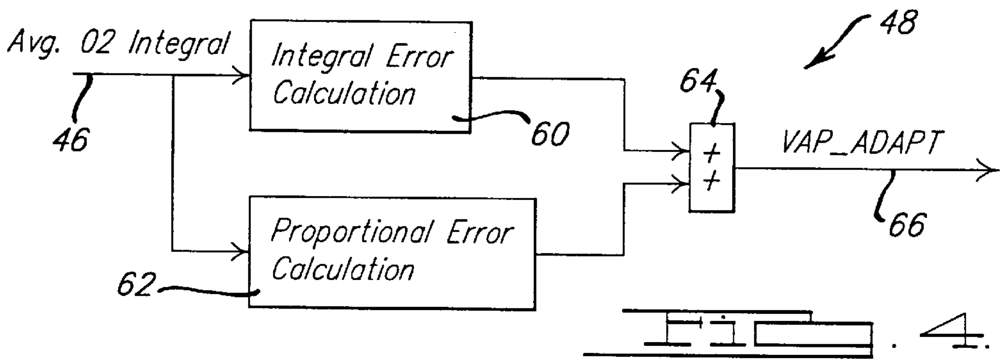
FIG. 4 is a more detailed view of the tactical adaption portion of the purge compensation of FIG. 3.

Referring momentarily to FIG. 4, a more detailed illustration of the tactical adaptive routine 48 is illustrated. The average oxygen sensor integral error 46 is sent to an integral error calculation block 60 and to a proportional error calculation block 62 of a proportional-integral controller. The results of the integral error calculation 60 and the proportional error calculation 62 are summed at block 64 and the result is the vapor adaptive error term 66 (formerly referred to as the tactical error or short term purge compensation value). The vapor adaptive error term 66 forms the basis for all learning within the purge system. That is, the vapor adaptive error term 66 represents the purge vapor concentration level that has not yet been properly accounted for in the canister and/or tank models. The goal of the system is to drive this error to "zero" by properly learning the unaccounted for purge concentration into the appropriate canister or tank model.

Referring again to FIG. 3, the vapor adaptive error term 66 is sent to the strategic adaptive routine 50, formerly referred to in FIG. 2 as the purge adaption routine 50, for directing the vapor adaptive error term 66 to the appropriate model (i.e., canister model or fuel tank model). The direction of the vapor adaptive term 66 depends upon the purge mode (i.e., mode 0, mode 1, or mode 2) within which the vehicle is operating as described above. The strategic adaptive routine 50 also slows the learning rate of the system for stability. The goal of the strategic adaptive routine 50 is to drive the vapor adaptive error term 66 to zero. The criteria for redirecting the learning from canister mass (in Mode 1) to Tank Flow Rate (Mode 2) is made by the mode logic routine 29 described above. The main criteria for this transition is based upon the amount of flow that has passed through the canister (i.e., accumulated canister flow) in mode 1.

Figure 5:
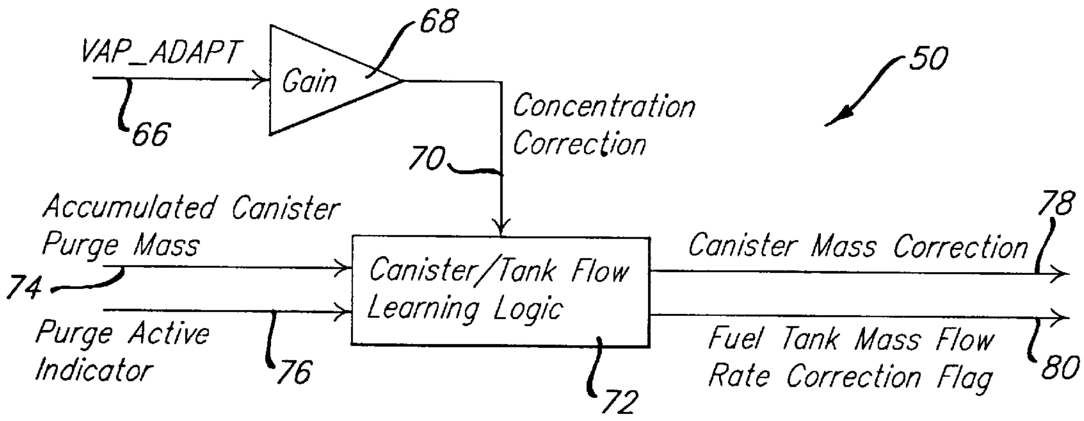
FIG. 5 is a more detailed view of the strategic adaption portion of the purge compensation model of FIG.3.

Referring momentarily to FIG. 5, a more detailed view of the strategic adaptive routine 50 is illustrated. The vapor adaptive error term 66 is applied to a gain at 68 and is then sent as a concentration correction value 70 to the canister/tank flow learning logic 72. In the canister/tank flow learning logic 72, the concentration correction value 70 is combined with an accumulated canister purge mass value 74 at a time when a purge active indicator 76 is set. The accumulated canister purge mass value 74 is calculated by integrating the calculated instantaneous purge valve mass flow rate minus the calculated tank mass flow rate and using this value to indicate when the system is "viewing" a portion of the canister surface (SEE FIG. 6) with a reduced slope (the larger the slope, the more difficult the learning). The resulting output of the canister/tank flow learning logic 72 is a canister mass correction value 78 and a fuel tank mass flow rate correction flag 80.

Referring again to FIG. 3, from the strategic adaptive routine 50, the canister mass correction value 78 is forwarded in mode 1 to the canister model 52. Similarly, the fuel tank mass flow rate correction flag 80 is outputted from the strategic adaptive routine 50 in mode 2 to the fuel tank model 54.

Figure 6:
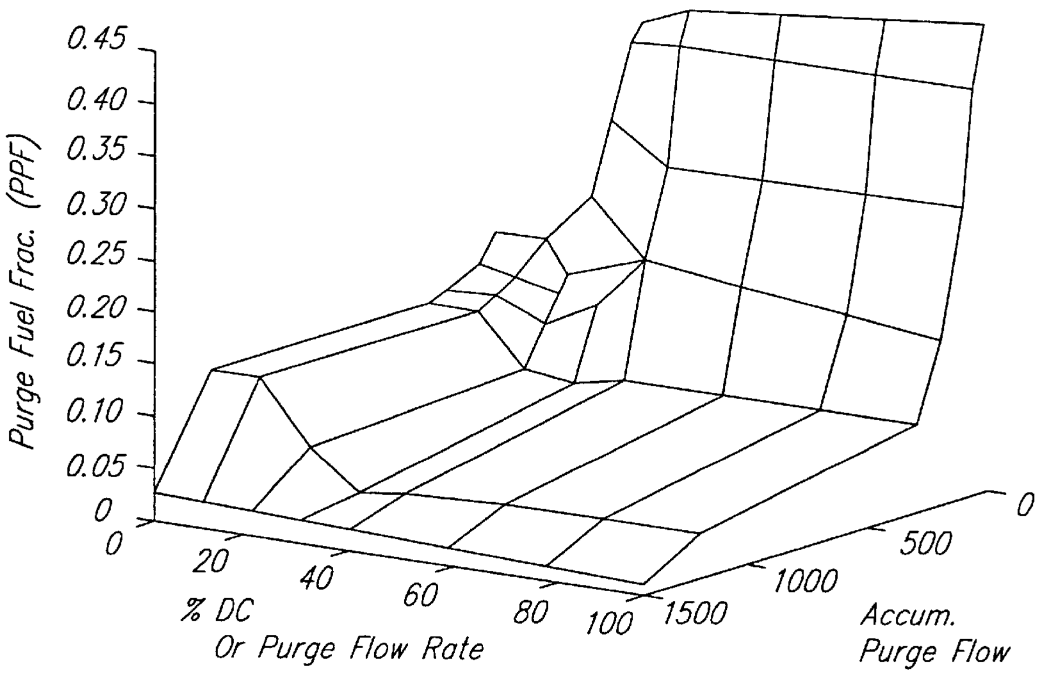
FIG. 6 is a graphic illustration of a three-dimensional surface used for determining purge fuel concentration.
Figures 4, 5:
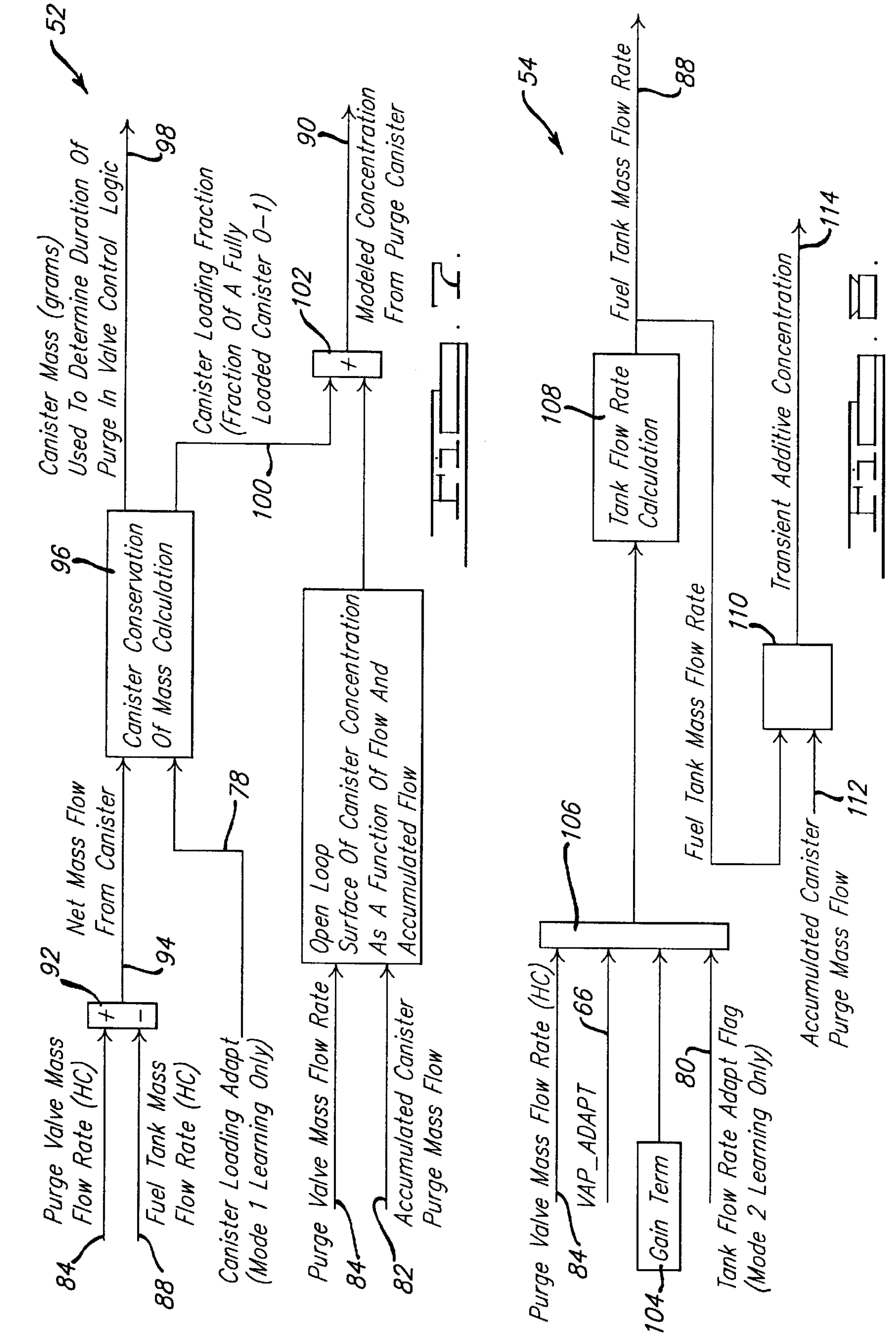

Referring momentarily to FIG. 6, a three-dimensional surface for use in conjunction with the canister model 52 is illustrated. The surface includes a purge fuel fraction input along the z-axis, purge flow rate (or % duty cycle applied to the purge valve depending on the type of device) along the x-axis and accumulated purge flow along the y-axis. The open loop canister surface is the central mechanism around which purge concentration learning occurs. By using the output of the surface as a baseline of what should occur from a system with canister input only, any deviations from these predictions can be attributed to tank vapor flow rate which is the only other possible input to the system.

The open loop surface describes the concentration level that can be expected based on the current purge valve mass flow rate and the accumulated canister purge mass flow. This surface is calibrated in a controlled environment by setting the valve flow rate constant and measuring the concentration obtained from the canister device (measurement can be achieved through feedback calculation or by direct sensor measurement). Accumulated canister flow is calculated during this process and concentration is mapped against this axis.

Since this surface is generated using a canister that is loaded to maximum capacity, the maximum concentration from the canister at any given flow condition is known. By learning what fraction of that maximum concentration is being measured (through feedback) an estimate of the loading (a fraction of a fully loaded canister) can be learned in mode 1. Once the canister loading is learned in mode 1, the trajectory or path to be followed through the surface is known if the canister is the only source of vapor. This is achieved by multiplying the canister loading fraction by the output of the canister surface. Since the majority of driving conditions result in tank flows that are a minor contributor of purge vapors in relation to the canister, this method results in a very feasible approach to the problem. That is, deviations from the learned path are the result of another source of vapor. Since there is only one other source, it must be the tank flow rate. It should be noted that the level of canister loading represents the ratio of the mass in grams of HC present in the canister relative to the maximum measured mass of the HC content under a 1.5 X canister load on a loading bench.

Referring now temporarily to FIG. 7, a more detailed view of the canister model 52 is illustrated. The purge valve mass flow rate 84 is used with the fuel tank mass flow rate 88 at block 92 to yield a net mass flow to the canister 94. The net mass flow to the canister 94 is used with the canister mass correction value 78 at block 96 in a canister conservation of mass calculation. The canister mass 98 is used to determine the duration of purge in the purge mode logic.

The canister conservation of mass calculation 96 is performed by the following equation:

Net Mass Flow from Canister 94=Purge Valve Mass Flow Rate (HC) 84−Fuel Tank Mass Flow Rate;

Mass depleted from the canister this software cycle=Net Mass Flow from Canister 94*Interval Time (sec.); and Canister Mass 98=Previous Canister Mass−Mass Depleted from the canister this software cycle.

If the Mode=1 (meaning canister learning is occurring):

Canister Mass=Previous Canister Mass—Mass Depleted from the canister this software cycle+Canister Loading Adapt 78 (Note that this also allows large tank flow rates to increase the canister mass under low flow conditions.)

Else:

Canister Mass=Previous Canister Mass—Mass Depleted from the canister this software cycle;

Canister Loading Fraction 100=Canister Mass 98/Maximum Calibrated Canister Mass; and Modeled Concentration from the Purge Canister 90=Canister Loading Fraction 100*Open Loop Canister Surface value of concentration (as a function of flow and accumulated flow).

The canister loading fraction 100 is used with the purge valve mass flow rate 84 and the accumulated canister purge mass flow 82 at block 102 to yield a model concentration value 90 from the purge canister. For example, if 10% concentration is learned and the outer limit surface has a maximum value of 20% for the current flow and accumulated flow, then the load faction is 10/20 or 0.5 such that from that point forward the outer limit value *0.5 gives the actual concentration as the canister is depleted. If the canister is the only source of vapor, the job is done for the drive.

Referring again to FIG. 3, the fuel tank model 54 determines a flow rate of vapor from the fuel tank based on a learned value and a transient purge compensation value. That is, the fuel tank model 54 looks for the fuel tank mass flow rate correction flag 80 in order to combine the vapor adaptive error term 66 and the purge valve mass flow rate 84 to yield the fuel tank mass flow rate 88. When in mode 2, the vapor adaptive term 66 is used to learn the tank mass flow rate term up or down in order to drive the vapor adaptive term 66 to "zero".

Referring momentarily to FIG. 8, the fuel tank model 54 is illustrated in greater detail. When the tank flow rate adapt flag 80 is set, the purge valve mass flow rate 84 and vapor adaptive error term 66 are combined with a gain term 104 at block 106 and then sent to a tank flow rate calculation block 108. At block 108, the difference between the purge valve mass flow rate 84 (i.e., the amount of purge vapor from the canister) and the vapor adaptive error term 66. The tank flow rate calculation block 108 yields a fuel tank mass flow rate 88 which is fed back to the canister model 52 (see FIG. 3) as well as to a lookup surface block 110 for combination with the accumulated canister purge mass flow value 112 to yield a transient additive concentration value 114.

Based on the level of tank flow rate present, the surface provides an additive amount of concentration over time following a purge valve shut off condition such as a long deceleration with purge off (in DFSO). This additive concentration represents the buildup of vapor in the dome of the canister and the upper regions of the carbon in the canister as the tank flow saturates these areas while the valve flow is stopped. Without this feature, purge vapor surges would occur due to this buildup resulting in increased HC emissions and possible drive problems.

Referring again to FIG. 3, the canister model 52 outputs the canister concentration value 90 to the purge transport delay 56 for further processing. The purge transport delay routine 56 calculates the total concentration of vapor at the purge valve 116 and a transport delay 118 from the purge valve to the manifold. The purge transport delay routine 56 receives the vapor adaptive error term 66 from the tactical adaptive routine 48, the fuel tank mass flow rate 88, and transient additive concentration value 114 from the fuel tank model 54, the canister concentration value 90 from the canister model 52, the commanded proportional purge solenoid flow 42 based on the mode of operation, and the purge valve mass flow rate 84.

Figure 9:
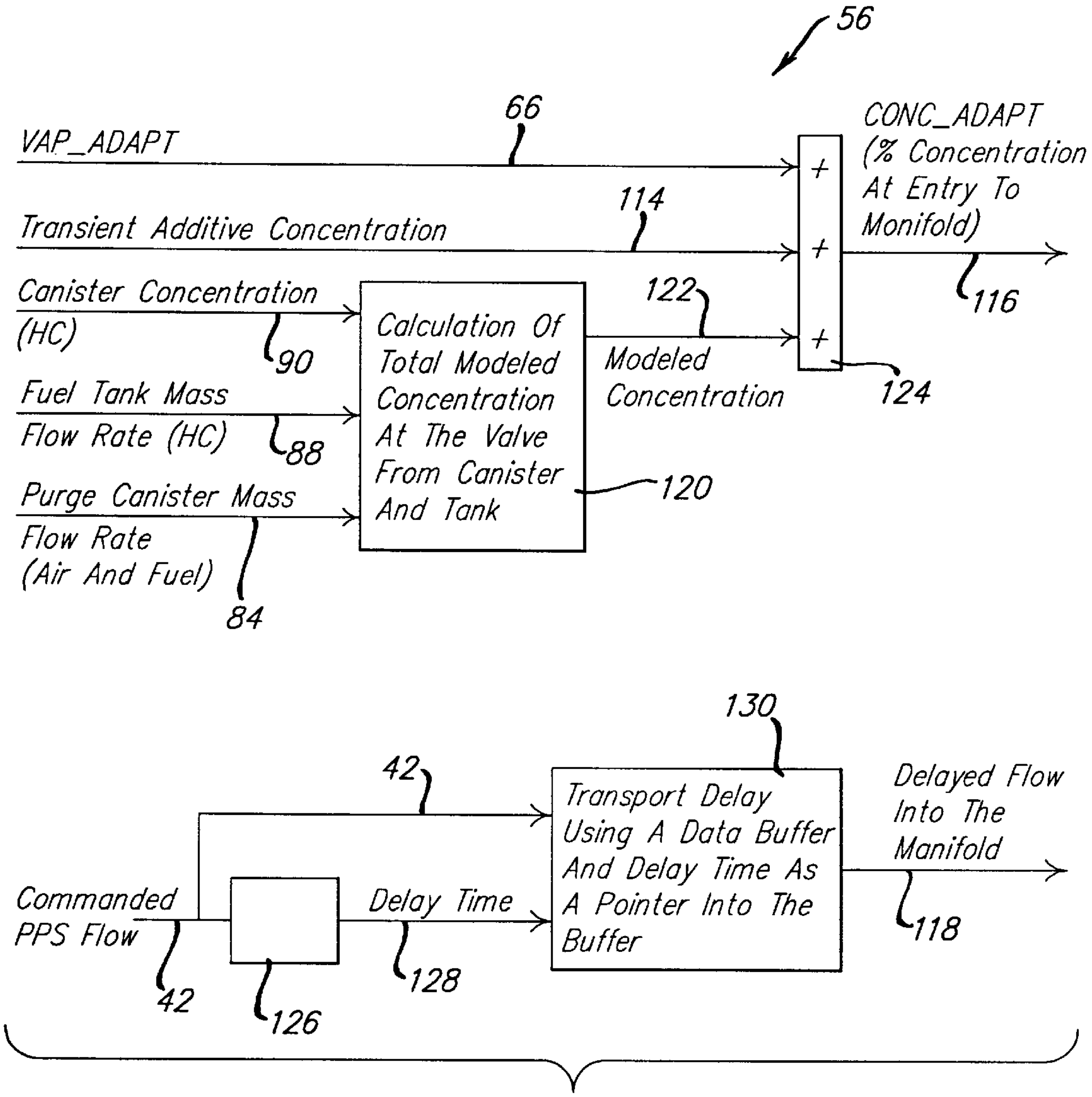
FIG. 9 is a more detailed view of the purge transport delay portion of the purge compensation model of FIG. 3.

Referring momentarily to FIG. 9, the purge transport delay routine 56 is illustrated in greater detail. The purge canister mass flow rate 84 is combined with the fuel tank mass flow rate 88 and canister concentration value 90 at block 120 to calculate a total modeled concentration of vapor at the purge valve from the canister and tank. The modeled concentration 122 is combined with the transient additive concentration 114 and the vapor adaptive error term 66 at block 124 to yield a concentration of vapor value 116 at the entry of the manifold. Further, the commanded proportional purge solenoid flow 42 is sent to a block 126 to look up the appropriate amount of delay time from a table. The resulting delay time 128 is used with the commanded proportional purge solenoid flow 42 at block 130 to yield a transport delay 118 to delay the flow into the manifold.

Figure 10:
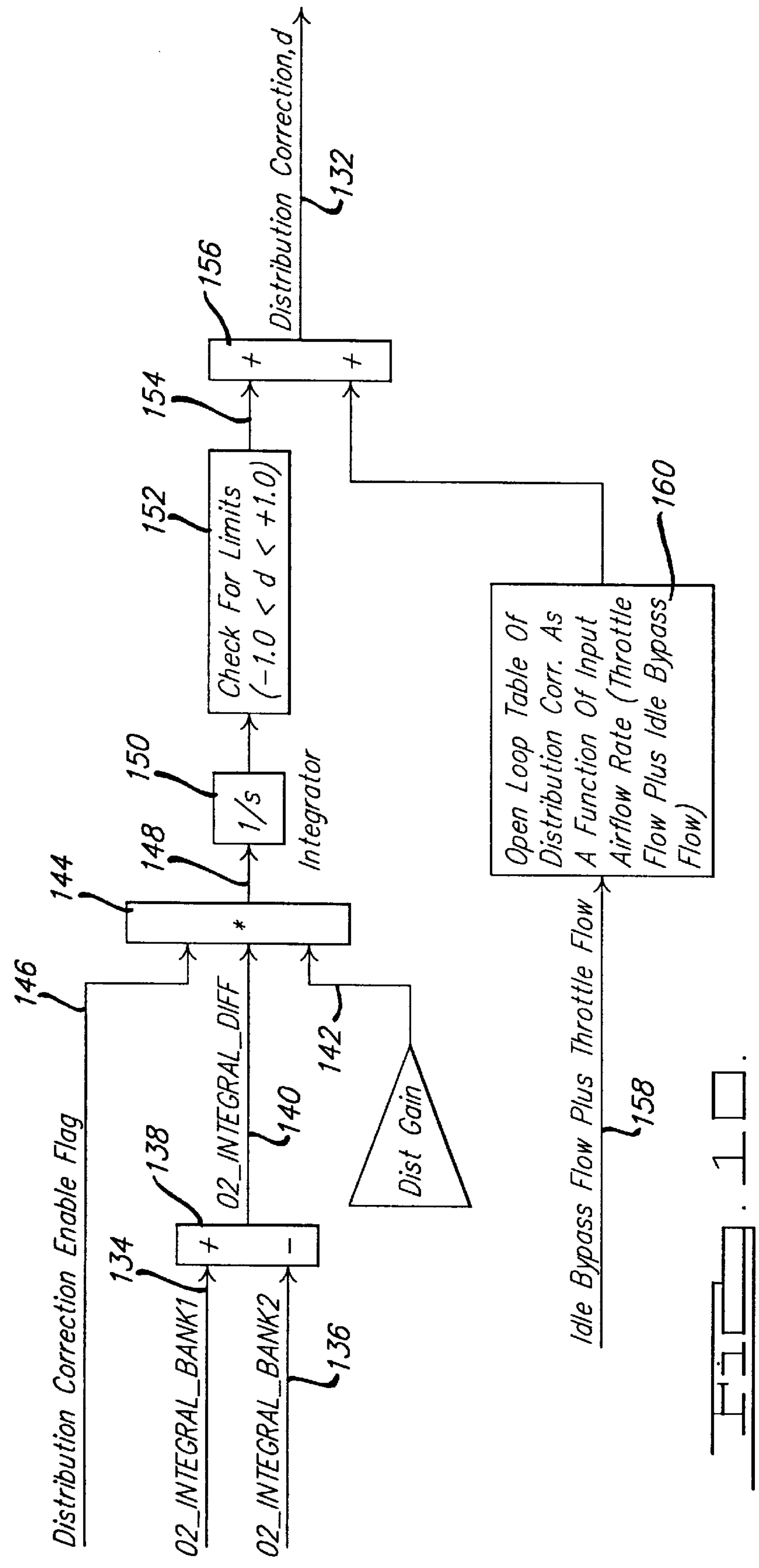
FIG. 10 is a diagrammatic illustration of the bank-to-bank distribution correction portion of the method of the present invention.

Referring again to FIG. 3, the percentage concentration of vapor 116 at the entry of the manifold is sent at the delay time 118 to the manifold filling equations 58. Referring momentarily to FIGS. 1 and 10, the manifold filling equations 58 will now be described in greater detail. As is known, V-type engines include two banks of cylinders. These banks of cylinders are illustrated in FIG. 1 as bank 1 and bank 2. Depending on the nature of the air flow through the manifold 18, more or less of the vapor concentration could end up in either bank 1 or bank 2. As such, a vapor distribution correction value 133 is used.

In order to define the nature of the air flow through the manifold 18, an oxygen sensor is used in each bank. By comparing the oxygen sensor values to one another, a pattern of the flow through the manifold 18 is obtained. Thus, referring to FIG. 10, an oxygen sensor feedback integral value 134 for bank 1 is combined with an oxygen sensor feedback integral value 136 for bank 2 at block 138 to yield an oxygen sensor integral difference value 140. The oxygen sensor integral difference value 140 is combined with a distribution gain value 142 at block 144 when a distribution correction enable flag 146 is set. The resulting distribution value 148 of the combined oxygen sensor integral difference value 140 and distribution gain value 142 is integrated at integrator 150 (like an integral controller) and forwarded to a limiter 152. The limiter 152 forces the integrated distribution value 148 to be between −1 and +1.

The resulting integrated and limited distribution value 154 is forwarded to block 156. In block 156, the value 154 is added to the output of an open-loop distribution correction table 160. The open-loop table 160 is a function of input airflow rate, as defined by the sum of idle bypass flow and throttle flow 158. This open loop table 160 reduces the feedback instability of distribution correction 132. After the addition, the corresponding distribution correction value 132 is calculated.

The bank-to-bank distribution correction value 132, hereinafter labeled “d”, is used as follows:

If:

a1=purge fuel flow for bank 1; then a1=port gas flow rate (bank 1) * manifold purge concentration;

and if:

a2=purge fuel flow for bank 2; then a2=port gas flow rate (bank 2)*manifold purge concentration.

Thus, if d<0:

fuel flow (from purge) into bank 1=a1−d*a2; and fuel flow (rom purge) into bank 2=(1+d)*a2;

and if d>0:

fuel flow (from purge) into bank 1=(1−d)*a1; and fuel flow from purge) into bank 2=a2+d*a1.

It is worthwhile to note that when the calculated distribution correction d equals zero, purge flow follows the volumetric efficiency and air flow prediction. When d equals −1, all purge flow goes to bank 1 as shown in FIG. 1. Also, when d equals 1, all purge flow goes to bank 2 as shown in FIG. 1. Moreover, for single bank engines, d equals 0.

For the Fueling effect to be correctly compensated, the Purge concentration/mass flow at the entry to the intake manifold has to be converted into a concentration/mass flow at the intake port. This transformation is performed as part of the Manifold Filling block. Referring again to FIG. 3, after performing the manifold filling equations at block 58, the port purge percent concentration 162 is sent to the engine controller such that the amount of fuel delivered from the fuel injectors is adjusted to accommodate the additional presence of the volatile fuel vapor. As such, the proper fuel to air ratio is maintained and drivability is improved.

Thus, the present invention provides a means for compensating for the presence of purge vapor in the combustion chambers of an automotive vehicle engine. More particularly, the amount of fuel delivered through each fuel injector is modified depending on the purge flow through a proportional purge solenoid of an evaporative emission control system of the vehicle. Depending on the source of the purge vapor and its flow, different modifications to the fuel to air ratio are implemented.

Those skilled in the art can now appreciate from the foregoing description that the broad teachings of the present invention can be implemented in a variety of forms. For example, the distribution correction and accompanying fuel flow calculations can be identically replicated for EGR (Exhaust Gas Recirculation) systems. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of learning a flow rate of purge vapors from a fuel tank in an evaporative emissions control system comprising:

determining a concentration of purge vapor in said evaporative emissions control system;

determining a mass flow rate of purge vapor at a purge valve of said evaporative emissions control system; and combining said concentration of purge vapor and mass flow rate of purge vapor to yield a fuel tank mass flow rate.

2. The method of claim 1 wherein said step of determining a concentration of purge vapor in said evaporative emissions control system further comprises oxygen sensor feedback.

3. The method of claim 1 wherein said step of determining a concentration of purge vapor in said evaporative emissions control system further comprises oxygen sensor feedback in combination with a model of concentrations based on purge vapor flow rates and accumulated purge vapor flow.

4. The method of claim 1 wherein said step of determining a mass flow rate of purge vapor at said purge valve further comprises direct sensor measurement.

5. The method of claim 1 wherein said step of combining said concentration of purge vapor and mass flow rate of purge vapor further comprises subtracting said mass flow rate of purge vapor from said concentration of purge vapor.

6. A method of learning a flow of purge vapors from a fuel tank in an evaporative emissions control system comprising:

learning a canister purge vapor loading value;

comparing said canister purge vapor loading value to a model of canister loading values; and attributing a difference between said canister purge vapor loading value and said model of canister loading values to said flow of purge vapors from said fuel tank.

7. The method of claim 6 wherein said step of learning a canister purge vapor loading value further comprises:

sensing a concentration of purge vapor in said evaporative emissions control system;

sensing flow conditions of said evaporative emissions control system;

dividing said concentration of purge vapor by a model value of concentration for said flow conditions to yield a concentration fraction; and multiplying a maximum loading capacity of said canister by said concentration fraction.

8. The method of claim 6 wherein said step of comparing said canister purge vapor loading value to a model of canister loading values further comprises dividing said concentration of purge vapor by a model value of concentration for known flow conditions to yield a concentration fraction.

* * * * *